(12) United States Patent
Bone (10) Patent No.: US 6,536,903 B2
(45) Date of Patent: Mar. 25, 2003

(54) SYSTEM AND METHOD FOR IMPROVING CONTRAST IN AN ELECTRO-OPTICAL IMAGING SYSTEM

(75) Inventor: Matthew F. Bone, Fremont, CA (US)

(73) Assignee: Aurora Systems, Inc., San Jose, CA (US)

(*) Notice: Subject to any disclaimer, the term of this patent is extended or adjusted under 35 U.S.C. 154(b) by 0 days.

(21) Appl. No.: 09/870,434

(22) Filed: May 29, 2001

(65) Prior Publication Data

US 2002/0180935 A1 Dec. 5, 2002

(51) Int. Cl.⁷ ............................................... G03B 21/00
(52) U.S. Cl. ................... 353/31; 353/69; 349/9
(58) Field of Search ........................ 353/31, 20, 37, 353/38, 69, 71, 100, 101, 102; 349/9

(56) References Cited

U.S. PATENT DOCUMENTS

| | | | | |
|---|---|---|---|---|
| 5,272,496 A | * | 12/1993 | Nicolas et al. ............... | 353/34 |
| 5,986,815 A | * | 11/1999 | Bryars ........................ | 359/634 |
| 6,022,110 A | * | 2/2000 | Tsujikawa .................... | 353/20 |
| 6,028,656 A | * | 2/2000 | Buhrer et al. ................ | 349/196 |
| 6,076,931 A | * | 6/2000 | Bone et al. .................. | 353/100 |
| 6,450,645 B1 | * | 9/2002 | Jeon .......................... | 349/9 |

* cited by examiner

*Primary Examiner*—Russell Adams
*Assistant Examiner*—Michelle Nguyen
(74) *Attorney, Agent, or Firm*—Henneman & Saunders; Larry E. Henneman, Jr.

(57) ABSTRACT

An off-axis projection system includes a polarizer, a reflective light modulator, an analyzer, and an aberration compensation element. The polarizer polarizes an illumination beam to form a polarized illumination beam. The reflective light modulator receives the polarized illumination beam along a first optical path, modulates the polarized illumination beam to form an imaging beam, and reflects the imaging beam along a second optical path not parallel to the first optical path. The aberration compensation element is disposed in either or both of the polarized illumination beam and the imaging beam. The separation of the illumination beam and the imaging beam provided by the off-axis architecture facilitates the use single-pass aberration compensation elements, including liquid crystal compensation films and wave retarders. A multi-color projection system is also disclosed.

30 Claims, 9 Drawing Sheets

SYSTEM AND METHOD FOR IMPROVING CONTRAST IN AN ELECTRO-OPTICAL IMAGING SYSTEM

BACKGROUND OF THE INVENTION

1. Field of the Invention

This invention relates generally to electro-optical imaging systems, and more particularly to a system and method for improving contrast in a reflective display projection system.

2. Description of the Background Art

Contrast is an important measure of an imaging systems performance. To match the performance of cathode ray tubes (CRTs) and/or film, contrasts of greater than 300:1 are required. Further, such contrasts must be achieved at low f-numbers to insure sufficient light throughput. In multi-colored systems, the contrasts levels must be achieved for each color.

Figure 1:
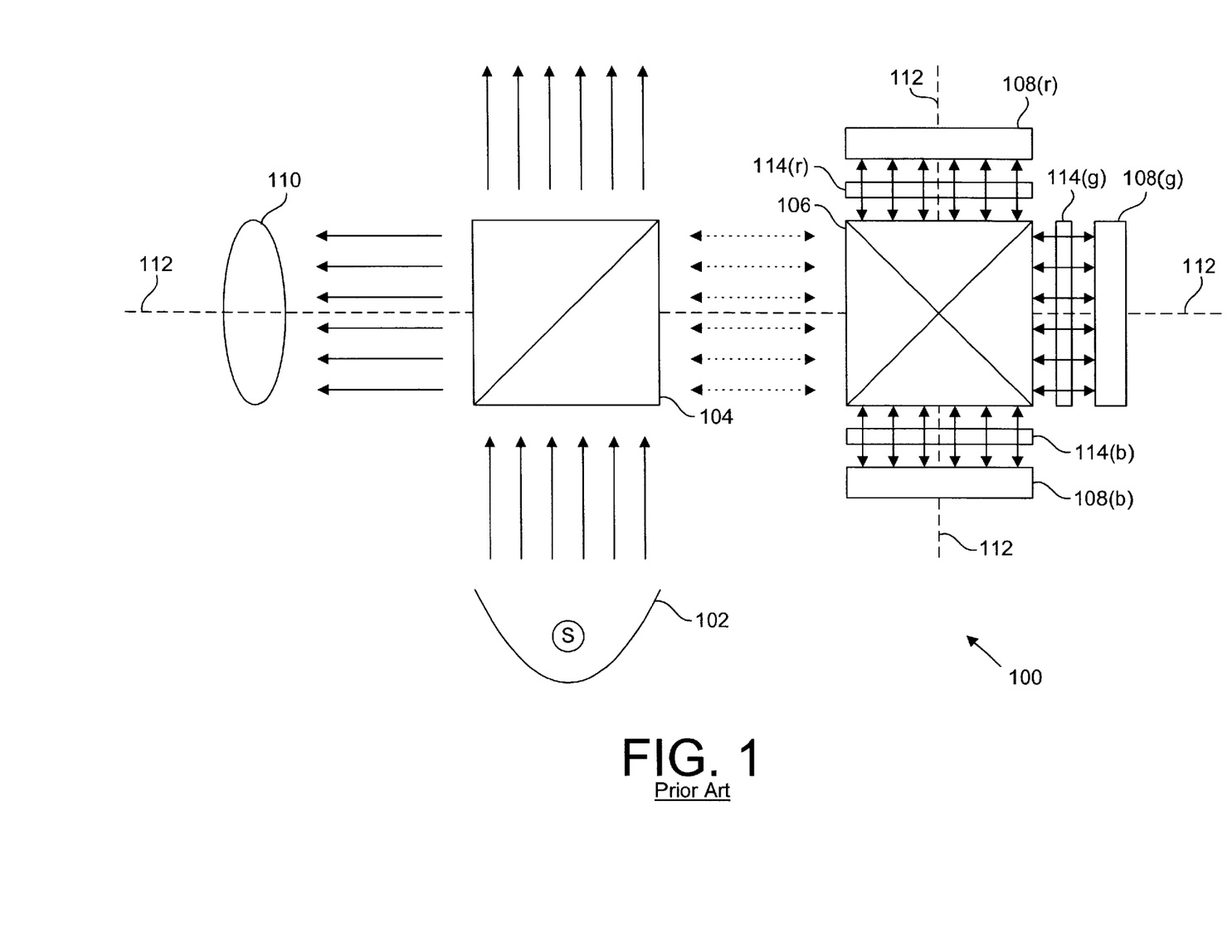
FIG. 1 is a block diagram of a prior art reflective projection system.

FIG. 1 shows a typical reflective display based projection system 100, that illustrates the operation of a polarizing electro-optical imaging system. Projection system 100 includes an illumination source 102, a polarizing beam splitter 104, a color separator 106, a plurality of reflective liquid crystal displays (LCDs) 108(r, g, and b), and projection optics 110. Illumination source 102 generates a source beam of white light and directs the source beam toward polarizing beam splitter 104, which passes one portion of the source beam having a first polarity, and redirects another portion (an illumination beam) of the source beam having a second polarity along a system axis 112, toward color separator 106. Color separator 106 separates the illumination beam into its red, green, and blue components, and directs each of these colored illumination beams to a respective one of LCDs 108(r, g, and b). Each of LCDs 108(r, g, and b) is controlled by a system, e.g., a computer or other video signal source (not shown), and modulates the polarity of selective portions (i.e., pixels) of the colored illumination beams to form colored imaging beams, which are reflected back toward color separator 106. Color separator 106 recombines the colored imaging beams to form a composite imaging beam and directs the composite imaging beam back along system axis 112, toward polarizing beam splitter 104, which passes only the modulated portions of the composite imaging beam to projection optics 110. Projection optics 110 then focuses the modulated portions of the composite imaging beam onto a display surface (not shown).

The limiting contrast of an imaging system is defined as the maximum light output during an "ON" state ($I_m$) divide by the light output (leakage) during an "OFF" state ($I_l$).

$$\text{Limiting Contrast} = (I_m)/(I_l) \tag{Eq. 1}$$

Polarization aberrations reduce contrast in polarizing optical imaging systems, by introducing unwanted polarization changes in the light. These changes increase leakage ($I_l$) in the case of an "OFF" state, thereby significantly reducing the limiting contrast.

One source of polarization aberrations is the field angle dependence of the polarization vector. In particular, when using a polarizing beam splitter, the orientation of the polarization vector is perpendicular to the plane of incidence of the light passing therethrough. In other words, the polarization of a light ray passing through the system depends on the particular angle that the ray makes with the polarizer. The greater the field angle, the greater the polarization aberration. This aberration is further increased as the f-number of the system is reduced to provide adequate light throughput. In systems such as system 100, the field angle dependence of polarizing beam splitter 104 can be compensated for by positioning a ¼-wave plate 114(r, g, b) in front of each LCD 108(r, g, b), respectively.

Another source of polarization aberrations is the angular variation in the polarization characteristics of the liquid crystal layers of imagers 108(r, g, b). LCD compensation films such as wide view polarizing films (manufactured and supplied by Fuji Optical Films and marketed by companies such as Nitto Denko and Polatechno) are used to reduce such aberrations in certain transmissive displays (e.g., lap-top computer displays). However, such compensation films cannot be used in reflective systems like system 100, because as the light makes a second pass (after reflection by the LCD) through the film, the compensation effect of the film is reversed.

What is needed, therefore, is a system and method for improving the contrast in an electro-optical imaging system (e.g., an LCD projector) by reducing polarization aberrations. What is also needed is a system and method for improving contrast in systems with relatively small f-numbers.

SUMMARY

The present invention overcomes the problems associated with the prior art by providing an off-axis electro-optical imaging system (e.g., an LCD projector), wherein the illumination beam and imaging beam are separated to facilitate the use of a single-pass aberration compensation element. The invention achieves improved contrast at low f-numbers, thereby providing an important advantage over the prior art.

The projection system includes a polarizer, a reflective light modulator, an analyzer, and an aberration compensation element. The polarizer polarizes an illumination beam to form a polarized illumination beam. The reflective light modulator receives the polarized illumination beam along a first optical path, modulates the polarized illumination beam to form an imaging beam, and reflects the imaging beam along a second optical path not parallel to the first optical path. The aberration compensation element is disposed in at least one of the polarized illumination beam and the imaging beam. The separation of the illumination beam and the imaging beam provided by the off-axis architecture facilitates the use single-pass aberration compensation elements.

In one particular embodiment, the polarizer and the analyzer are sheet polarizers, oriented with their transmission axes perpendicular to one another. In a more particular embodiment, the aberration compensation element is a half-wave retarder. In an even more particular embodiment, the aberration compensation element is a sheet retarder oriented with its fast axis perpendicular to the nominal transmission axis of either the polarizer or the analyzer, to compensate for the field angle dependence of the transmission axes of the polarizer and the analyzer.

In another particular embodiment, the reflective light modulator is a liquid crystal display, and the aberration compensation element is a liquid crystal compensation film. The liquid crystal compensation film can be disposed in either the illumination beam or the imaging beam. Optionally, the liquid crystal compensation film is used in conjunction with a half-wave retarder. The liquid crystal compensation film and the half-wave retarder can be embodied in a single element, or can be spaced apart from one another.

A multi-channel embodiment is also disclosed. The multi-channel projection system includes a color separator, a plurality of polarizers, a plurality of reflective light modulators, a plurality of analyzers, a plurality of aberration compensation elements, and a color combiner. The color separator separates a multi-colored illumination beam into a plurality of colored illumination beams. Each of the polarizers polarizes a respective one of the colored illumination beams to form a polarized, colored illumination beam. Each of the reflective light modulators modulates a respective one of the polarized, colored illumination beams to form a colored imaging beam, and reflects the colored imaging beam in a direction not perpendicular to the surface of the display. Each analyzer analyzes a respective one of the colored imaging beams, and the color combiner combines the analyzed imaging beams to form a multi-colored imaging beam.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing an off-axis electro-optical imaging system having an aberration compensation element disposed between a polarizer and an analyzer to compensate for polarization aberrations resulting from variations in field angle and/or liquid crystal properties. The separation, provided by the off-axis architecture, of the beams incident upon and reflected from a reflective LCD facilitates the use of single-pass and/or multi-pass aberration compensation elements, thereby significantly increasing the contrast of the system. In the following description, numerous specific details are set forth (e.g., particular types and brands of polarizers, retarders, and compensation films) in order to provide a thorough understanding of the invention. Those skilled in the art will recognize, however, that the invention may be practiced apart from these specific details. In other instances, details of well known optical practices (e.g., alignment, mounting, focusing, etc.) and components (e.g., illumination sources, various lenses, reflective LCD imagers, etc.) have been omitted, so as not to unnecessarily obscure the present invention.

Figure 2:
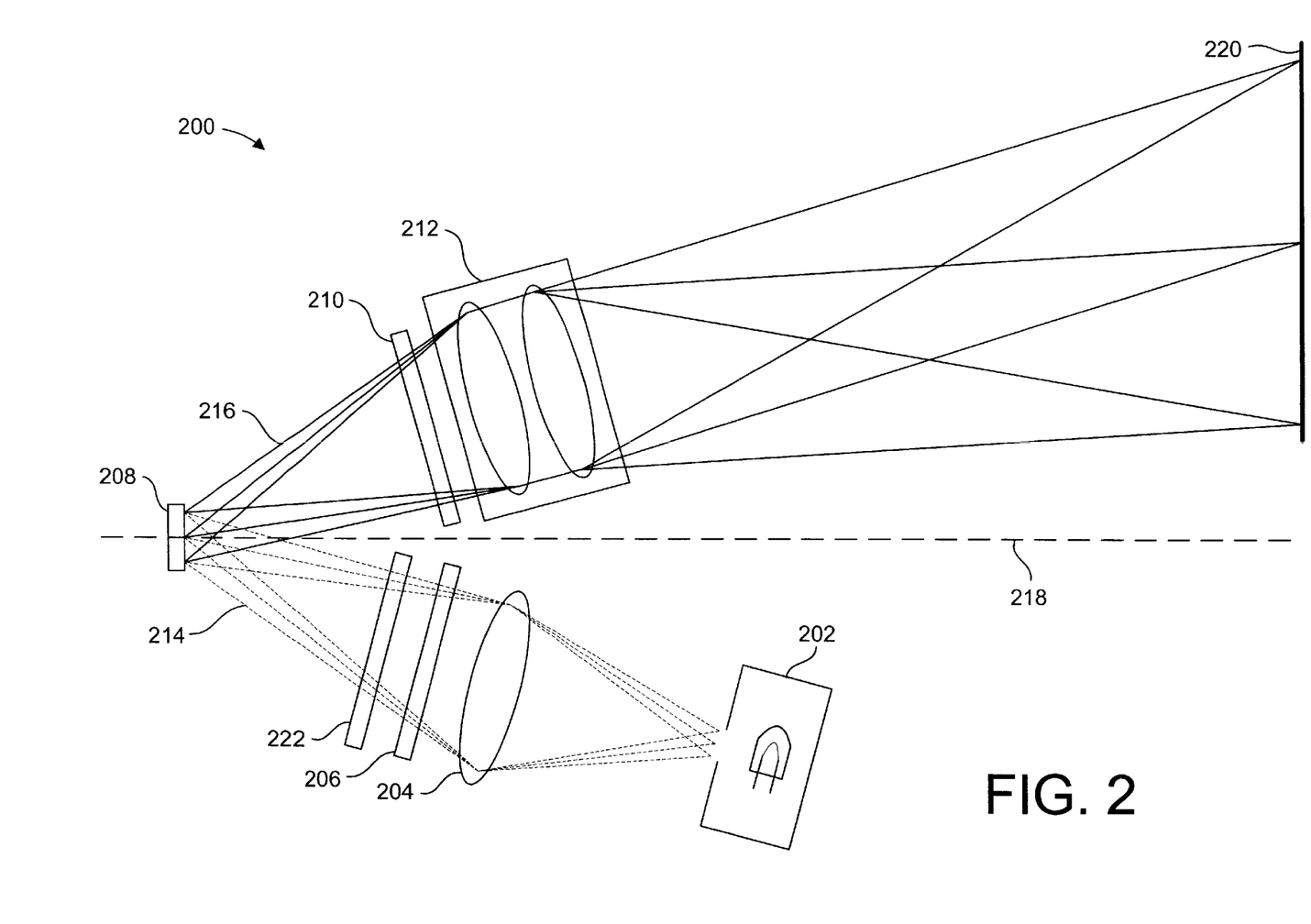
FIG. 2 is a block diagram of an off-axis projection system including an aberration compensation element according to the present invention.

FIG. 2 shows an off-axis projection system 200 to include an illumination source 202, a condenser lens 204, a polarizer 206, a reflective LCD 208, an analyzer 210, and a projection lens group 212. Illumination source 202 generates an illumination beam 214 that is focused by condenser lens 204 to pass through polarizer 206, and impinge on LCD 208 at a non-perpendicular angle. LCD 208 modulates polarized illumination beam 214, on a pixel by pixel basis, to form an imaging beam 216; and reflects imaging beam 216 through analyzer 210 toward projection lens group 212. Projection lens group 212 projects imaging beam 216 onto a display screen 220. A system axis 218 bisects the angle formed by illumination beam 214 and imaging beam 216.

The angular separation between illumination beam 214 and imaging beam 216 allows for the separation of polarizer 206 and analyzer 210. In this particular embodiment, polarizer 204 and analyzer 210 are both sheet polarizers of material HN42HE manufactured and sold by Polaroid Corporation. The transmission axes of polarizer 206 and analyzer 210 are oriented orthogonal to one another, such that no light will pass through analyzer 210, unless the polarization vector of a particular light ray is modulated by reflective LCD 208, or unless the light is subject to a polarization aberration. If, however, a pixel of reflective LCD 208 rotates the polarization axis of a light ray by 90 degrees, then the light should pass through analyzer 210 at maximum intensity, unless the light is subjected to a polarization aberration. Rotation of the polarization vector through some angle greater than 0 degrees but less than 90 degrees results in an intermediate intensity level, depending. on the degree of rotation.

The angular separation between illumination beam 214 and imaging beam 216 further allows the positioning of a single-pass aberration compensation element 222 between polarizer 206 and analyzer 210. In this particular embodiment, compensation element 222 is disposed in polarized illumination beam 214, but compensation element 222 can optionally be positioned in imaging beam 216. Aberration compensation element 222 is a single-pass compensation element, because light passing through the system makes only one pass through compensation element 222.

Examples of embodiments of single-pass compensation element 222 include, but are not limited to, a liquid crystal compensation film, a half-wave plate (e.g., a sheet retarder), or a combination thereof. A liquid crystal compensation film (e.g., a wide view polarizing film manufactured and supplied by Fuji Optical Films and marketed by companies such as Nitto Denko and Polatechno) corrects polarization aberrations caused by angular variations in the physical properties of the liquid crystal layer of reflective LCD 208. These compensation films have been widely used in applications such as lap-top computer displays, but to the inventor's knowledge have not been incorporated into reflective projection systems. A half-wave plate corrects polarization aberrations caused by polarizer 206 and analyzer 210, as will be more fully explained hereinafter.

Figure 3:
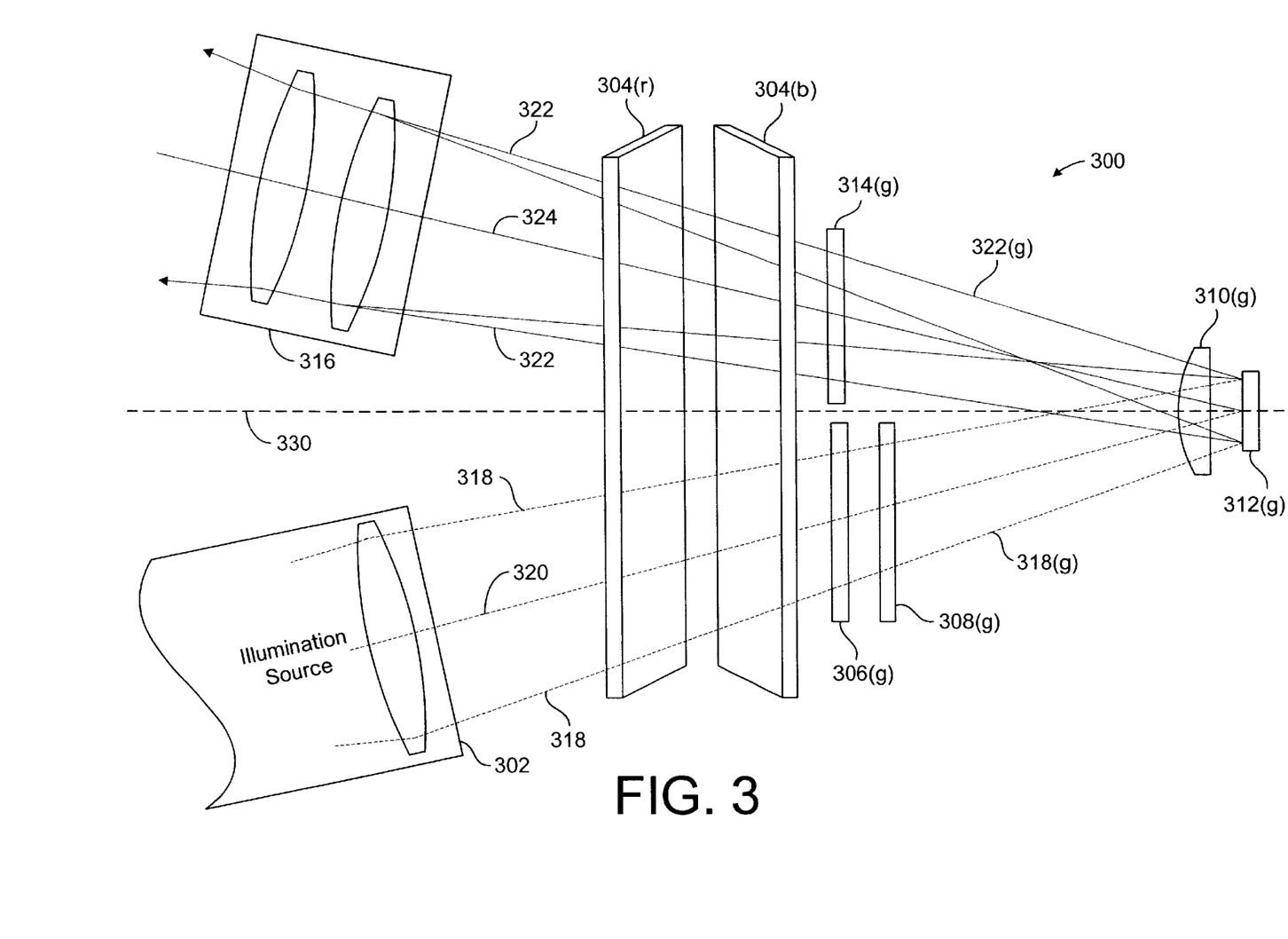
FIG. 3 is a side perspective view of one channel of a multi-channel imaging system including an aberration compensation element according to the present invention.

FIG. 3 shows one channel (green channel) of a multi-channel (multi-color) off-axis projection system 300, including an illumination source 302, a pair of dichroic plates 304(r and b), a polarizer 306(g), an aberration compensation element 308(g), a field lens 310(g), a reflective LCD 312(g), an analyzer 314(g), and a projection lens group 316. Illumination source 302 generates an illumination beam 318, and directs illumination beam 318, along an optical path 320, through dichroic plates 304(r, b) polarizer 306(g), aberration compensation element 308(g), and field lens 310(g) to impinge on LCD 312(g). Dichroic plates 304(r and b) reflect red and blue portions (not shown in FIG. 3) of illumination beam 318, respectively, and transmit the green portion 318(g) of illumination beam 318. Polarizer 306(g) linearly polarizes green illumination beam 318(g) into a first polarized state, corresponding to the transmission axis of polarizer 306(g).

LCD 312(g) is controlled by a system, e.g., a computer or video signal source, (not shown), and modulates the polarity of selected portions (i.e., pixels) of green illumination beam 318(g) to form a green imaging beam 322(g), which is reflected along an optical path 324, through analyzer 314(g) and dichroic plates 304(r, b). Dichroic plates 304(r, b) combine green imaging beam 322(g) with the red and blue imaging beams (FIG. 4) to form imaging beam 322, which continues along optical path 324 into projection lens group 316. Field lens 310(g) focuses the aperture stop (not shown) of illumination source 302 at a field stop (not shown) near the rear of projection lens group 316, thus avoiding the loss of much of the light of illumination beam 318.

Analyzer 314(g) is also a linear polarizer. Projection system 300 can operate in at least two different modes. For example, if the transmission axis of analyzer 314(g) is oriented parallel to the transmission axis of polarizer 306(g), then analyzer 314(g) will pass unmodulated portions and block modulated portions of green imaging beam 322(g). On the other hand, if the transmission axis of analyzer 314(g) is oriented orthogonally with respect to the transmission axis of polarizer 306(g), then analyzer 314(g) will pass modulated portions and block unmodulated portions of green imaging beam 322(g). In one embodiment, polarizer 306(g) and analyzer 314(g) are both fashioned from HN42HE polarizing material available from Polaroid Corporation.

Aberration compensation element 308(g) is positioned in green illumination beam 318(g), to correct polarization aberrations, which tend to reduce the contrast of system 300. Positioning compensation element 308(g) in green illumination beam 318(g), or optionally green imaging beam 322(g), allows compensation element 308(g) to be optimized for a particular color (i.e., green). For example, birefringent elements (e.g., wave-plates, sheet retarders, etc) rotate the polarization vector of light passing therethrough by an amount depending on the elements thickness and the wavelength of the light. Thus, to obtain a particular polarization rotation, the element must have a thickness that depends on the wavelength of light passing therethrough. Similarly, aberration compensation elements in the red and blue channels (FIG. 4) of system 300 can be optimized for their respective colors. Further, where aberration compensation element 308(g) includes a liquid crystal compensation film, the ability to optimize each film for its particular color provides an advantage over prior art uses of such films (e.g., laptop displays) where all of the light passes through a single compensation film, thereby requiring design compromises in such films.

Figure 4:
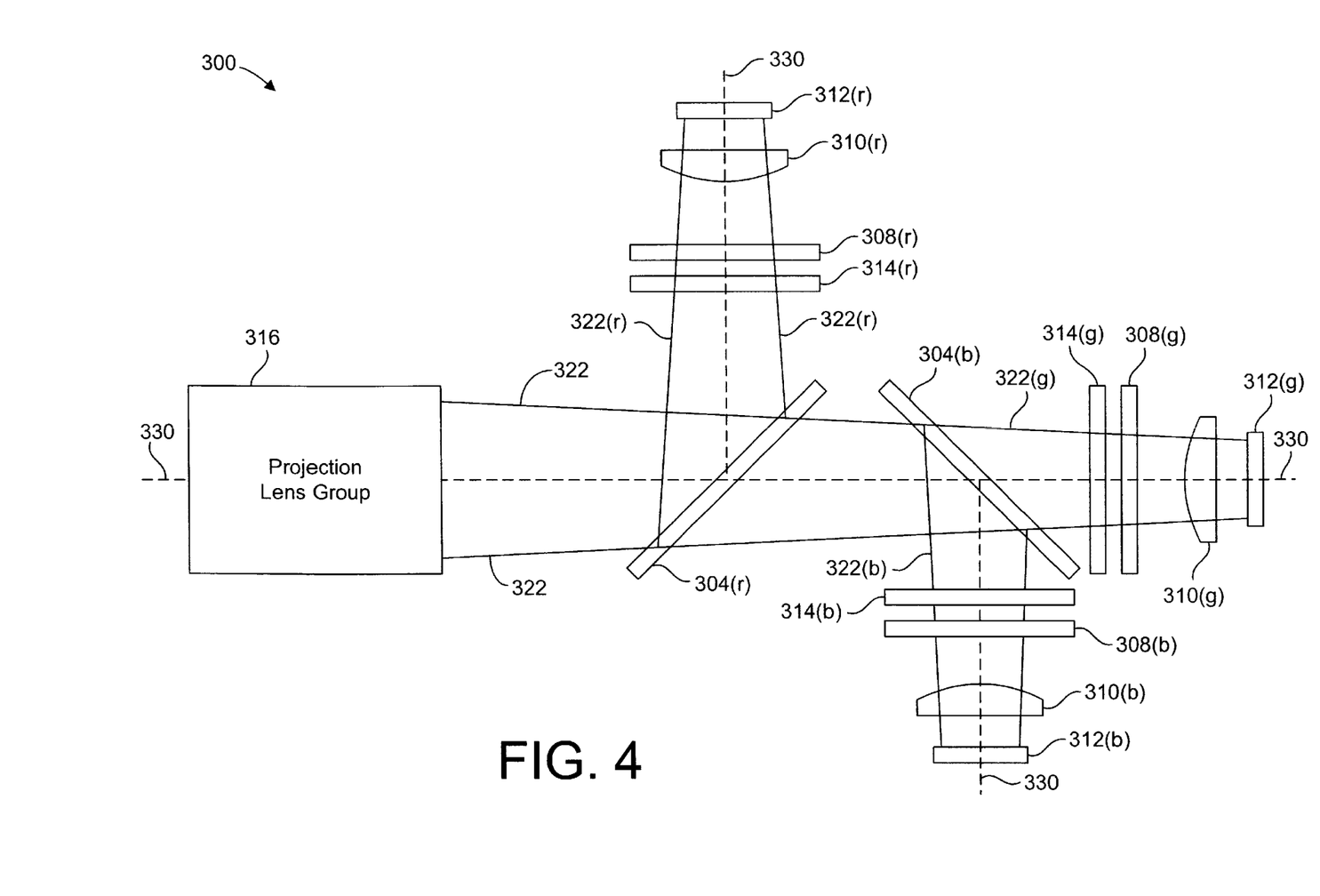
FIG. 4 is a top view of the imaging. system of FIG. 3.

FIG. 4 is a top view of system 300, including the remaining color channels of the system. System axis 330 lies in the plane of the page, while imaging beams 322(r, g, b) and 322 extend up out of the page, and obscure the views of illumination beams 318(r, g, b) and 318, which rise from illumination source 302 located beneath the plane of the page. Similarly, analyzers 314(r, g, b) are disposed above the plane of the page, and obscure the views of polarizers 306(r, g, b), respectively. Aberration compensation elements 308(r, g, b) are visible, but lie beneath the plane of the page. Field lenses 310(r, g, b) and reflective LCDs 312(r, g, b) intersect the plane of the page.

Figure 5:
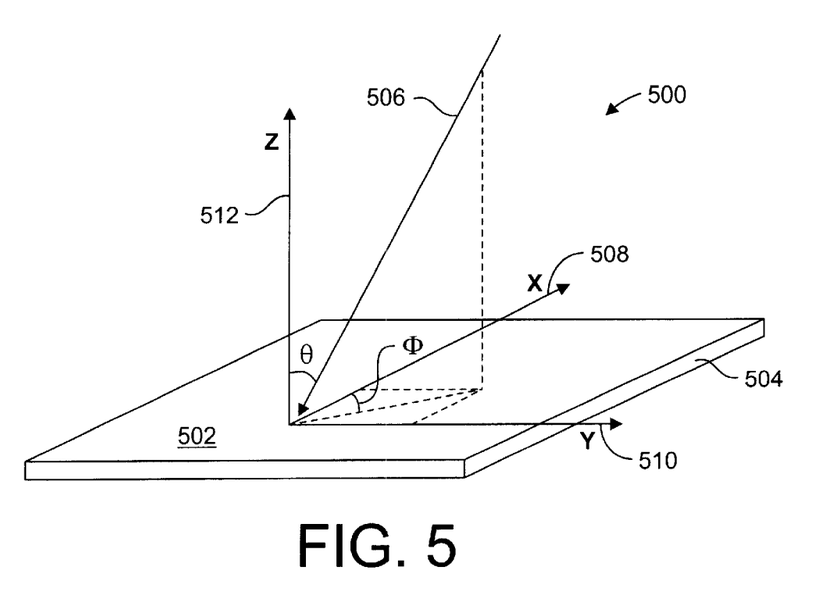
FIG. 5 is a perspective view of a light ray incident upon a polarizer.

FIG. 5 shows an (x, y, z) coordinate system 500 superimposed on the front surface 502 of a linear polarizer 504. Coordinate system 500 is useful in describing polarization aberrations that depend on the particular orientation of an incident light ray 506. The x-axis 508 lies in the plane of surface 502, and is parallel to the transmission axis of the polarizer. The y-axis 510 also lies in the plane of surface 502, and is orthogonal to x-axis 508. The z-axis 512 is orthogonal to the plane of surface 502. All three axes 508, 510, and 512 intersect in the plane of surface 502, at the point of incidence of ray 506.

Two angles shown in FIG. 5 will be used to describe the orientation of light ray 506. The polar angle ($\theta$) is defined to be the angle formed between ray 506 and z-axis 512, and is descriptive of the angular deviation of ray 506 from normal incidence with respect to surface 502. The azimuthal angle ($\Phi$) is defined as the angle formed between x-axis 508 and the projection of ray 506 on surface 502 of polarizer 504. Azimuthal angle ($\Phi$) is descriptive of the angular deviation of ray 506 with respect to the nominal transmission axis of polarizer 504.

Sheet polarizers are very desirable for use in LCD applications, because of their wide field of view. Light transmitted through sheet polarizers remains linearly polarized over extremely wide field angles (e.g., greater than 45°). As a result, sheet polarizers can be used in systems having a relatively low f-number, thereby maximizing system brightness. Sheet polarizers, however, suffer from the disadvantage that the polarization axis of transmitted light varies slightly as a function of the polar angle ($\theta$) and the azimuthal angle ($\Phi$) of the incident light. The amount of angular deviation ($\Omega$) of the polarization vector of transmitted light from the nominal transmission axis of the polarizer can be approximated by the following formula:

$$\Omega \approx B\theta^2 \sin(2\Phi) \qquad \text{(Eq. 2)}$$

where $$B = \pi(2 - 2n + n^2)/720n^2 \qquad \text{(Eq. 3)}$$

and where ($\theta$) is the polar angle, ($\Phi$) is the azimuthal angle, and (n) is the refractive index of the polarizer.

Figure 6:
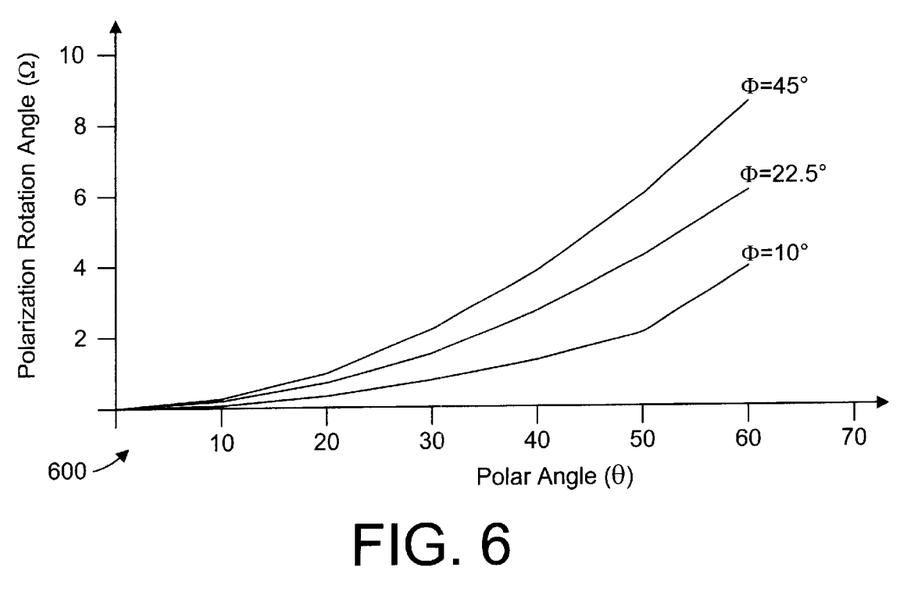
FIG. 6 is a graph showing the rotation of the polarization vector with respect to the transmission axis of a typical sheet polarizer, as a function of polar and azimuthal angles of incident light rays.

FIG. 6 is a graph 600 showing the deviation ($\Omega$) of the polarization vector, in degrees of rotation, as a function of polar angle ($\theta$) for three different azimuthal angles ($\Phi=10°$, 22.5° and 45°). In an off-axis projection system such as system 200 of FIG. 2, the marginal rays will have an azimuthal angle ($\Phi$) of about 45° and a polar angle ($\theta$) of about 30°. As shown in graph 600, these marginal rays will suffer an undesirable rotation in their polarization vector of about 2°. Furthermore, as the f-number of the system is decreased, the azimuthal angle ($\Phi$) and the polar angle ($\Phi$) of the marginal rays will increase, leading to an even greater deviation in the polarization vector.

Figure 7:
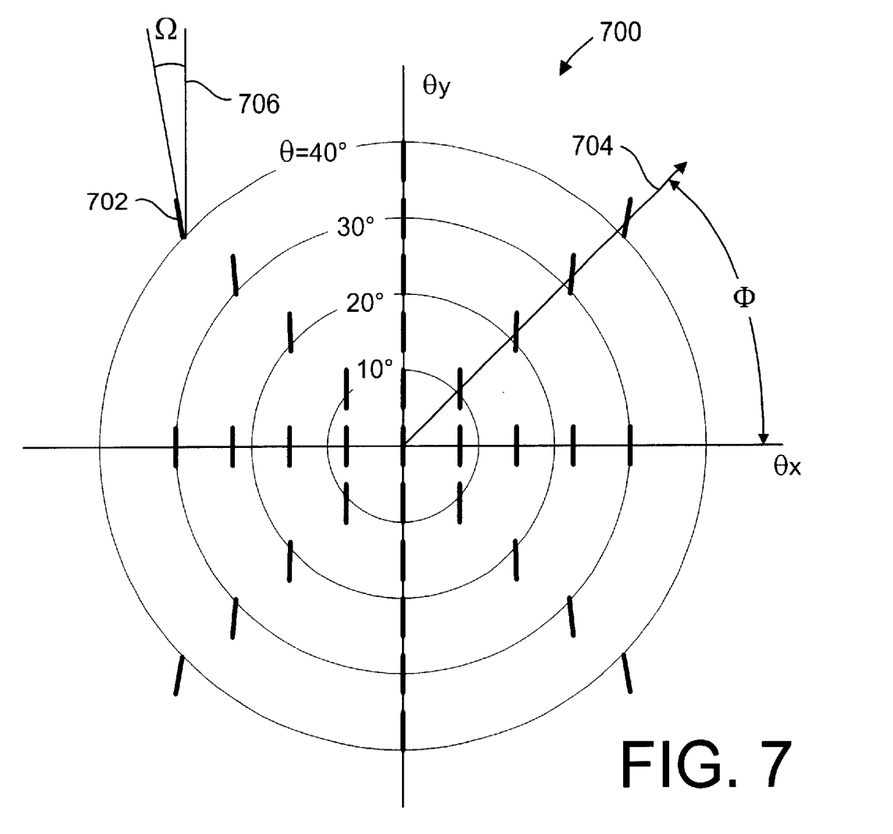
FIG. 7 is a diagram showing the rotation of the polarization vector with respect to the transmission axis of a typical sheet polarizer, as a fuiction of polar and azimuthal angles of incident light rays.

FIG. 7 is a diagram 700 showing the rotation ($\Omega$) of the polarization vector 702 of a transmitted ray 704 with respect to the nominal transmission axis 706 of a typical sheet polarizer, as a function of the polar (θ) and azimuthal (Φ) angles of incident light rays. Note that when the azimuthal angle (Φ) of ray 704 is equal to 0°, 90°, 180°, 270°, ..., the rotation (Ω) of the polarization vector 702 is zero. Further, for relatively small polar angles (10°–20°) there is only very slight deviation of the polarization axis of the ray. The maximum deviation occurs when the azimuthal angle (Φ) of ray 704 is equal to 45°, 135°, 225°, 315°, ..., and the polar angle (θ) is relatively large.

Figure 8:
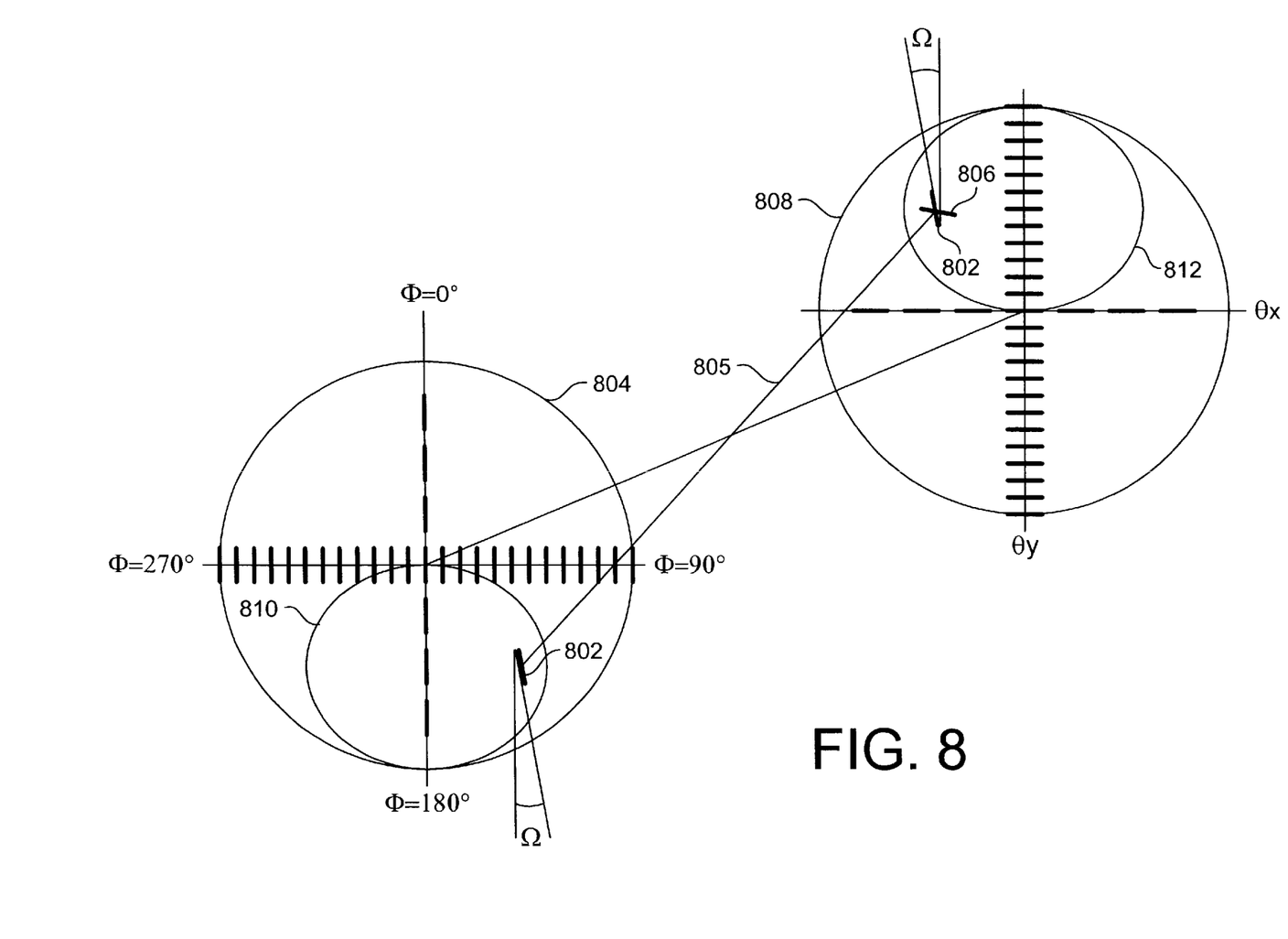
FIG. 8 is a diagram showing the relative orientation of the polarization vector of a light ray and the transmission axis of an analyzer, without aberration compensation.

FIG. 8 is diagram showing the deviated transmission axis 802 of a polarizer 804 and the deviated transmission axis 806 of an analyzer 808, encountered by a ray 805 passing through the system. Polarizer 804 and analyzer 808 are both sheet polarizers oriented with their nominal transmission axes orthogonal to one another. The optical path of the illumination beam 810 and the imaging beam 812 have been unfolded, and the reflective LCD imager is omitted, for clear explanation. Due to the off-axis architecture of the system, illumination beam 810 lies in the lower half of the polar/azimuthal plot for polarizer 804, and the imaging beam 812 lies in the upper half of the polar/azimuthal plot for the analyzer.

As a result of the angular rotation (Ω) of transmission axes 802 and 806, transmission axes 802 and 806 are not orthogonal to one another. Therefore, some portion of ray 805 will pass through analyzer 808. This light leakage degrades the contrast of the system.

Figure 9:
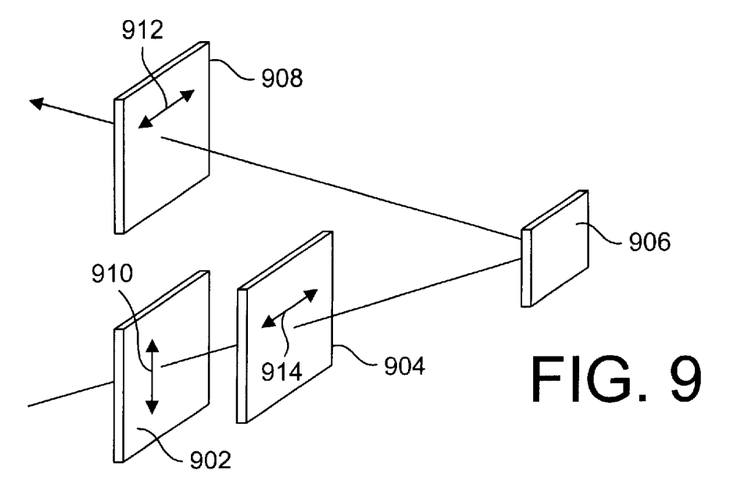
FIG. 9 is a perspective view showing respective orientations of a polarizer, an analyzer, and a compensation element, according to one embodiment of the present invention.

FIG. 9 is a representational view of an off-axis projection system, including a polarizer 902, an aberration compensation element 904, a reflective LCD 906, and an analyzer 908. The nominal transmission axis 910 of polarizer 902 and the nominal transmission axis 912 of analyzer 908 are oriented orthogonal to one another. Aberration compensation element 904 is a half-wave retarder (e.g., a sheet retarder) positioned between polarizer 902 and analyzer 908, and is oriented with its fast axis 914 orthogonal to transmission axis 910 of polarizer 902 and parallel to transmission axis 912 of analyzer 908. So disposed, aberration compensation element 904 substantially reduces the light leakage through analyzer 908.

Figure 10:
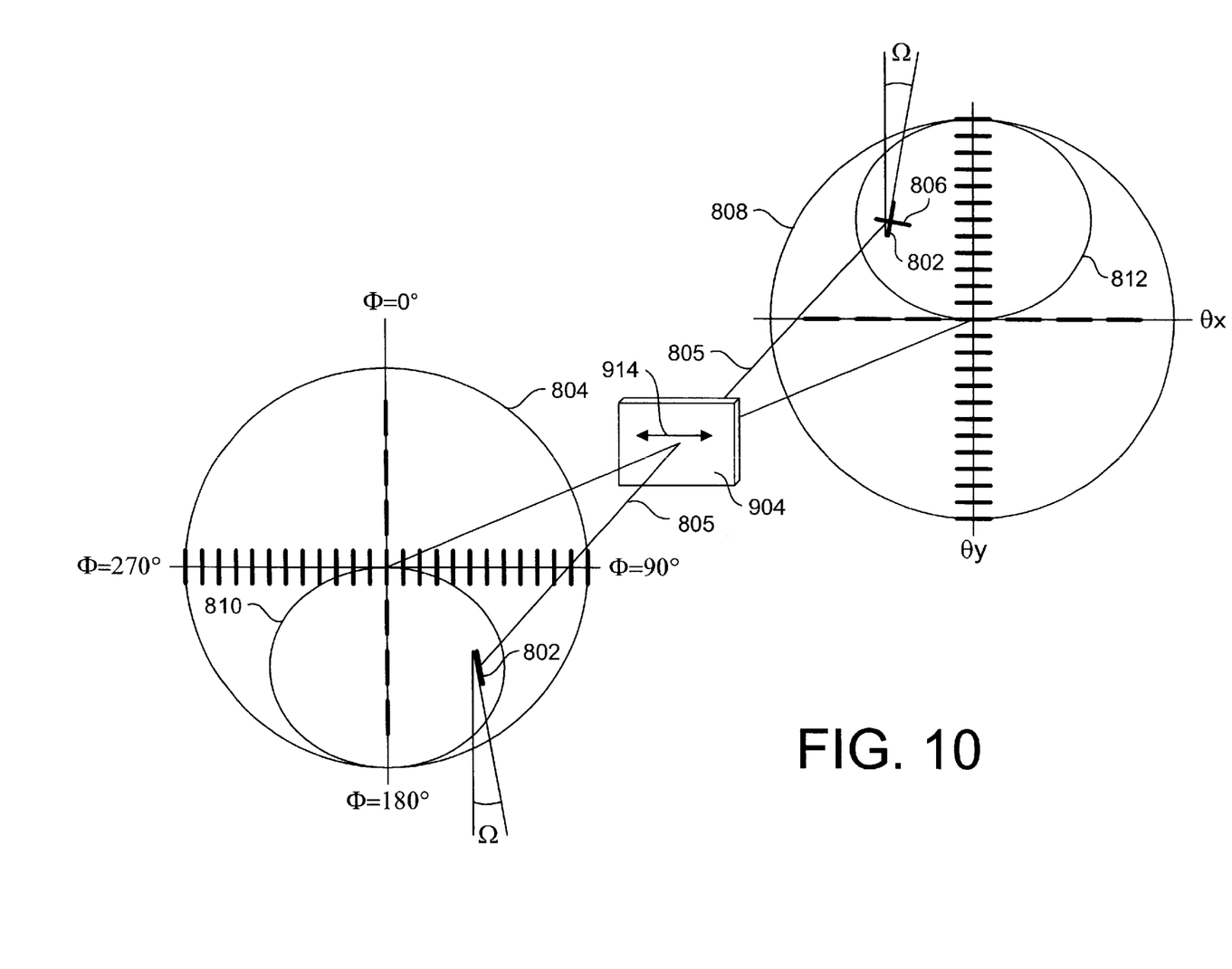
FIG. 10 is a diagram showing the relative orientation of the polarization vector of a light ray and the transmission axis of an analyzer, with aberration compensation according to the present invention.

FIG. 10 is a diagram substantially similar to the diagram of FIG. 8, but is modified to show aberration compensation element 904 and its effect on the relative orientation of polarization vector 802 of ray 805 and transmission axis 806 of analyzer 808. In particular, half-wave retarder 904 rotates polarization vector 802 of ray 805 by 180° about fast-axis 914. After rotation, polarization vector 802 of ray 805 is oriented orthogonal to transmission axis 806 of analyzer 808, thereby substantially reducing light leakage through analyzer 808. Overall system contrast of greater than 500:1 has been achieved in systems constructed according to the present invention.

Aberration compensation element 904 may optionally be oriented with its fast axis 914 parallel to the nominal transmission axis of polarizer 804. A 180° rotation of polarization vector 802 about fast axis 914 so oriented will also result in polarization vector 802 being orthogonal to transmission axis 806 of analyzer 808. Further, aberration compensation element 904 may optionally be disposed between reflective LCD display 906 and analyzer 908, in either of the above-described orientations.

Figure 11:
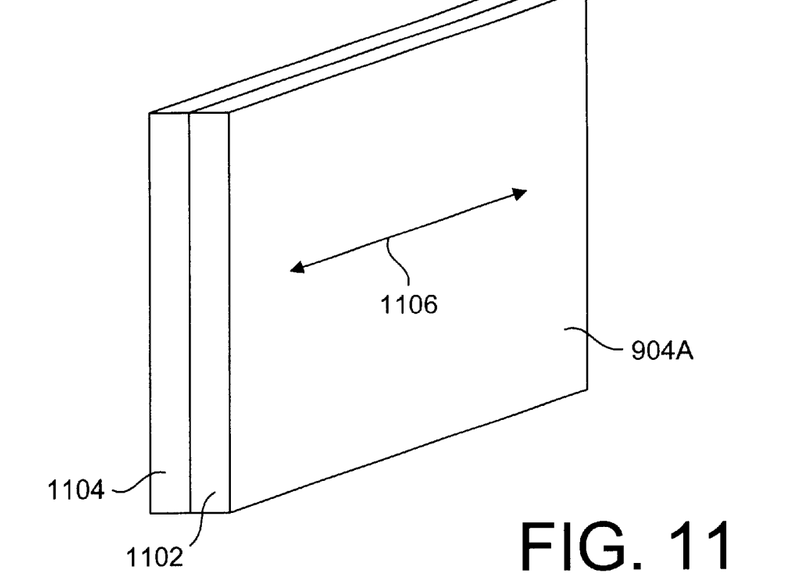
FIG. 11 is a perspective view of a compound aberration compensation element according to the present invention.

FIG. 11 shows an alternate aberration compensation element 904A to include a half-wave retarder 1102 and a. liquid crystal compensation film 1104, embodied in a single element. Retarder 1102 has a fast axis 1106 that is oriented as described above with respect to compensation element 904.

In one embodiment, liquid crystal compensation film 1104 is a wide view polarizing film manufactured and supplied by Fuji Optical Films and marketed by companies such as Nitto Denko and Polatechno. Alternate compensation element 904A can be disposed in either the illumination beam (between the polarizer and the LCD display) or the imaging beam (between the LCD display and the analyzer) of any of the off-axis systems disclosed herein.

Figure 12:
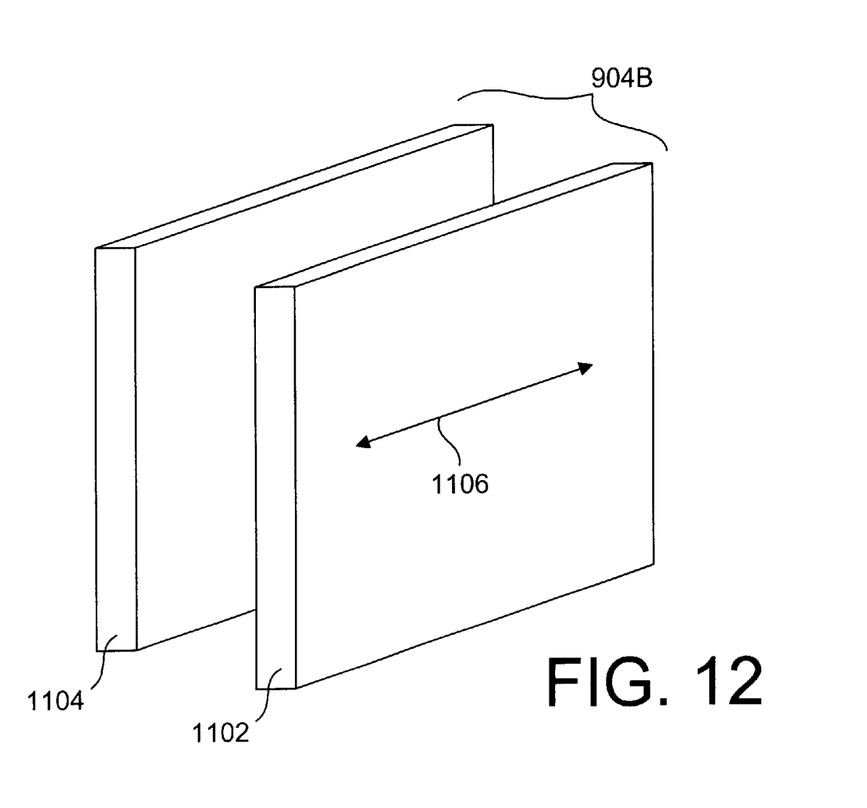
FIG. 12 is a perspective view of discrete aberration compensation elements according to the present invention.

FIG. 12 shows another alternate aberration compensation element 904B. Compensation element 904B is similar to compensation element 904A, except that half-wave retarder 1102 and liquid crystal compensation film 1104 are spaced apart from one another, thus providing flexibility in system design. For example, retarder 1102 and liquid crystal compensation film 1104 can both be disposed in either the illumination beam or the imaging beam of a system. Optionally, one of retarder 1102 and compensation film 1104 can be disposed in the illumination beam while the other is disposed in the imaging beam.

The description of particular embodiments of the present invention is now complete. Many of the described features may be substituted, altered or omitted without departing from the scope of the invention. For example, alternate polarizers/analyzers (e.g., different materials and types), may be substituted for the polarizers/analyzers disclosed herein. As another example, the projection systems disclosed herein may be embodied in rear-view projection systems such as projection televisions. These and other deviations from the particular embodiments shown will be apparent to those skilled in the art, particularly in view of the foregoing disclosure.

I claim:

1. An electro-optical imaging system comprising:
    a polarizer disposed to polarize an illumination beam to form a polarized illumination beam;
    a reflective light modulator for modulating said polarized illumination beam to form an imaging beam, said reflective light modulator disposed to receive said polarized illumination beam along a first direction and to reflect said imaging beam along a second direction not parallel to said first direction;
    an analyzer disposed in the path of said imaging beam; and
    a polarization aberration compensation element disposed in the path of at least one of said polarized illumination beam and said imaging beam.

2. An electro-optical imaging system according to claim 1, wherein:
    said reflective light modulator is a liquid crystal display; and
    said aberration compensation element comprises a liquid crystal compensation film.

3. An electro-optical imaging system according to claim 2, wherein said aberration compensation element further comprises a half-wave retarder.

4. An electro-optical imaging system according to claim 3, wherein said liquid crystal compensation film and said half-wave retarder are combined in a single element.

5. An electro-optical imaging system according to claim 1, wherein said aberration compensation element comprises a half-wave retarder.

6. An electro-optical imaging system according to claim 5, wherein said half-wave retarder is disposed between said reflective light modulator and said polarizer.

7. An electro-optical imaging system according to claim 5, wherein the fast axis of said half-wave retarder is oriented perpendicular to the transmission axis of one of said polarizer and said analyzer.

8. An electro-optical imaging system according to claim 7, wherein the fast axis of said half-wave retarder is oriented perpendicular to the transmission axis of said polarizer.

9. An electro-optical imaging system according to claim 1, wherein said polarizer and said analyzer are sheet polarizers.

10. An electro-optical imaging system according to claim 9, wherein said aberration compensation element is a sheet retarder having a fast axis oriented perpendicular to the transmission axis of one of said polarizer and said analyzer.

11. An electro-optical imaging system according to claim 10, wherein said aberration compensation element is a sheet retarder having a fast axis oriented perpendicular to the transmission axis of said polarizer.

12. An electro-optical imaging system according to claim 10, wherein said aberration compensation element further comprises a liquid crystal compensation film.

13. An electro-optical imaging system according to claim 1, wherein said polarization aberration compensation element is a single-pass element.

14. A projection system comprising:
   a color separator disposed to separate a multi-colored illumination beam into a plurality of colored illumination beams;
   a plurality of polarizers, each polarizer disposed to polarize a respective one of said colored illumination beams to form a polarized, colored illumination beam;
   a plurality of reflective light modulators, each reflective light modulator for modulating a respective one of said polarized, colored illumination beams to form a colored imaging beam, each of said reflective light modulators disposed to receive a respective one of said polarized, colored illumination beams along a first direction and to reflect said colored imaging beam along a second direction not parallel to said first direction;
   a plurality of analyzers, each of said analyzers disposed to analyze a respective one of said modulated colored beams;
   a plurality of aberration compensation elements, each of said aberration compensation elements disposed between a respective one of said polarizers and a respective one of said analyzers; and
   a color combiner disposed to combine said colored imaging beams to form a multi-colored imaging beam.

15. A projection system according to claim 14, wherein each of said aberration compensation elements is optimized for the particular color of the colored beam in which it is disposed.

16. A projection system according to claim 14, wherein:
   said reflective light modulators are liquid crystal displays; and
   said aberration compensation elements each comprises a liquid crystal compensation film.

17. A projection system according to claim 16, wherein said aberration compensation elements each further comprise a half-wave retarder.

18. A projection system according to claim 17, wherein said liquid crystal compensation films and said half-wave retarders are combined in single elements.

19. A projection system according to claim 14, wherein each of said aberration compensation elements comprises a half-wave retarder.

20. A projection system according to claim 19, wherein each of said half-wave retarders is disposed between a respective one of said reflective light modulators and a respective one of said polarizers.

21. A projection system according to claim 19, wherein the fast axis of each said half-wave retarders is oriented perpendicular to the transmission axis of a respective one of said polarizers or said analyzers.

22. A projection system according to claim 21, wherein the fast axis of each of said half-wave retarders is oriented perpendicular to the transmission axis of a respective one of said polarizers.

23. A projection system according to claim 14, wherein each of said polarizers and said analyzers are sheet polarizers.

24. A projection system according to claim 23, wherein each of said aberration compensation elements is a sheet retarder having a fast axis oriented perpendicular to the transmission axis of a respective one of said polarizers or said analyzers.

25. A projection system according to claim 24, wherein each of said aberration compensation elements is a sheet retarder having a fast axis oriented perpendicular to the transmission axis of a respective one of said polarizers.

26. A projection system according to claim 24, wherein each of said aberration compensation elements further comprises a liquid crystal compensation film.

27. A projection system according to claim 14, wherein said aberration compensation elements are single-pass elements.

28. An electro-optical imaging system comprising:
   polarizing means for polarizing an illumination beam to form a polarized illumination beam;
   a reflective light modulator for modulating said polarized illumination beam to form an imaging beam, said reflective light modulator disposed to receive said polarized illumination beam along a first direction and to reflect said imaging beam along a second direction not parallel to said first direction;
   analyzing means for analyzing said imaging beam; and
   aberration compensation means for at least partially compensating for aberrations caused by at least one of said polarizing means, said reflective light modulator, and said analyzing means.

29. An electro-optical imaging system according to claim 28, wherein said aberration compensation means is disposed between said polarizing means and said reflective light modulator.

30. An electro-optical imaging system according to claim 28, wherein said aberration compensation means is disposed in one but not both of said illumination beam and said imaging beam.

\* \* \* \* \*